United States Patent [19]

Citta et al.

[11] Patent Number: 5,461,619
[45] Date of Patent: Oct. 24, 1995

[54] SYSTEM FOR MULTIPLEXED TRANSMISSION OF COMPRESSED VIDEO AND AUXILIARY DATA

[75] Inventors: Richard W. Citta, Oak Park; Mark Fimoff, Hoffman Estates; Ray C. Hauge, Fox River Grove, all of Ill.

[73] Assignee: Zenith Electronics Corp., Glenview, Ill.

[21] Appl. No.: 88,285

[22] Filed: Jul. 6, 1993

[51] Int. Cl.[6] .................... H04J 3/22; H04J 3/16
[52] U.S. Cl. ............. 370/83; 370/84; 370/112; 370/85.6; 348/423; 348/429
[58] Field of Search .................... 370/102, 109, 370/111, 112, 84, 83, 110.1, 85.6, 60.1, 118; 358/142; 348/423, 467, 17, 606, 384, 469, 396, 429

[56] References Cited

U.S. PATENT DOCUMENTS

| | | | |
|---|---|---|---|
| 4,520,480 | 5/1985 | Kawai | 370/109 |
| 4,593,318 | 6/1986 | Eng et al. | 370/109 |
| 4,893,308 | 1/1990 | Wilson et al. | 370/111 |
| 4,975,771 | 12/1990 | Kassatly | 370/109 |
| 5,111,292 | 5/1992 | Kuriacose et al. | 348/469 |
| 5,113,256 | 5/1992 | Citta et al. | 358/133 |
| 5,168,356 | 12/1992 | Acampora et al. | 348/384 |
| 5,170,490 | 12/1992 | Cannon et al. | 370/111 |
| 5,228,033 | 7/1993 | Okouchi | 370/109 |
| 5,231,486 | 7/1993 | Acampora et al. | 348/469 |
| 5,231,492 | 7/1993 | Dangi et al. | 348/17 |
| 5,285,276 | 2/1994 | Citta | 348/469 |
| 5,287,178 | 2/1994 | Acampora et al. | 348/469 |

Primary Examiner—Douglas W. Olms
Assistant Examiner—Chau T. Nguyen

[57] ABSTRACT

A television signal transmission system comprises a multiplexer for combining a compressed video data signal and one or more auxiliary data signals to form a multiplexed signal for transmission over a channel of fixed bandwidth. The multiplexer is controlled to vary the ratio of the components comprising the multiplexed signal to insure satisfactory reproducible image quality in response to the received compressed video data signal. The compressed video data signal may be buffered prior to combination with the auxiliary data, in which case the multiplexer is also further controlled to vary the ratio of the components comprising the multiplexed signal to maintain the fullness of the buffer at an acceptable level.

16 Claims, 4 Drawing Sheets

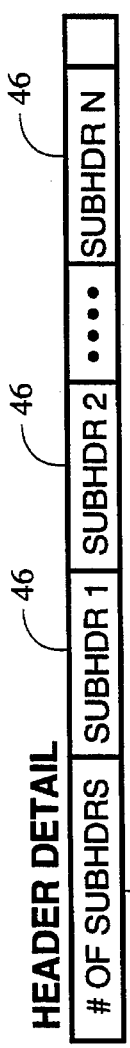
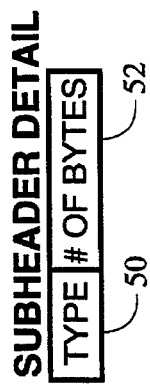
Fig. 7A
Fig. 7B
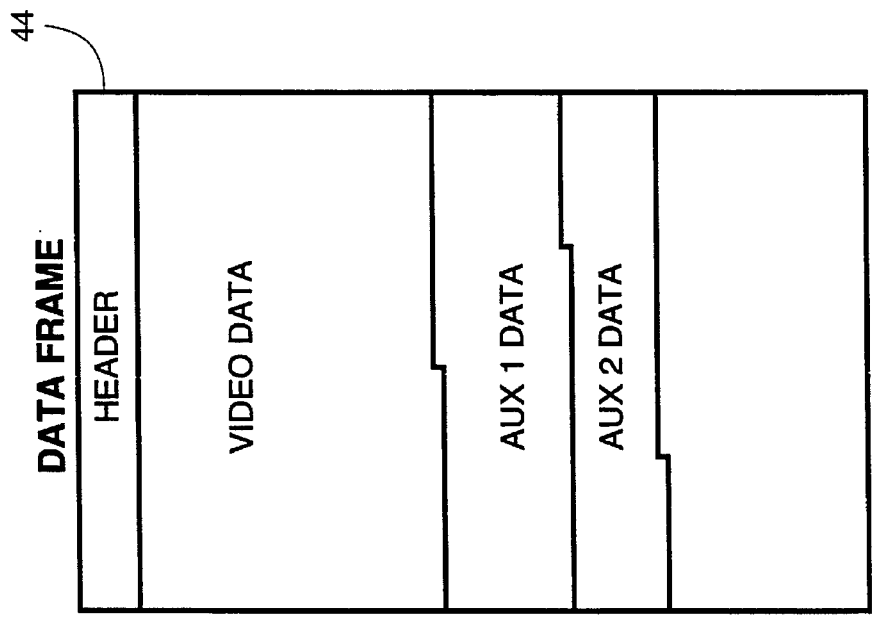
Fig. 6

SYSTEM FOR MULTIPLEXED TRANSMISSION OF COMPRESSED VIDEO AND AUXILIARY DATA

BACKGROUND OF THE INVENTION

The present invention relates generally to television signal transmission systems and particularly concerns a system for multiplexed transmission of a compressed television signal and one or more auxiliary data signals.

A number of systems have recently been proposed for digitally transmitting compressed television signals. High definition television (HDTV) and compressed NTSC, for example, employ this technology. FIG. 1 illustrates a typical prior art arrangement of such a system. In this system, a digital video signal is applied to a discrete cosine transform (DCT) circuit 10 and to a video compressor 12. The transform coefficients developed by DCT 10 are applied to a perceptual model (PM) circuit 14 which develops an output signal reflecting the perceptual nature of the input signal. U.S. Pat. No. 5,113,256 discloses an exemplary embodiment of such a circuit. Video compressor 12 preferably comprises a motion predictive encoder of the type well known in the art (e.g. of the MPEG variety) which provides a compressed variable rate video output signal. The compressed video signal is applied to a buffer 16 which acts as a regulator to provide the compressed video signal at a fixed rate to a packetizer 18. In particular, a control signal representing the fullness of the buffer is fed back to compressor 12 and, together with an output of PM 14, controls the operation of the compressor to maintain the buffer at a nominal level of fullness necessary to support the fixed rate output signal provided thereby. That is, as buffer fullness decreases, compressor 12 is operated to effect a decreased level of compression so that more video data is generated to increase the fullness of the buffer. On the other hand, as buffer fullness increases, the level of compression is increased so that less video data is applied to the buffer. Finally, the packetized, compressed fixed rate video signal is applied to a transmitter 20 for transmission over a suitable channel.

Although not necessarily limited thereto, in the HDTV application of the foregoing system, it is anticipated that terrestial HDTV broadcasts will be effected over respective 6 MHz television channels and that, in addition to compressed video information, there is a great desire on the part of the broadcasters to further use the transmission system for auxiliary data services, such as for paging systems, the provision of stock quotes and the like. The income stream realized by leasing spectrum within the television channel for providing these auxiliary services may be used by the broadcasters to at least partially offset the expense of installing and operating the HDTV broadcast facility. In order to maximize this revenue stream, it is desirable to utilize as much of the channel spectrum as possible for auxiliary data services without at the same time adversely effecting the quality of the reproduced HDTV signal. Prior art systems of the type shown in FIG. 1 are not particularly well suited for this purpose because of the inflexibility occasioned by the fixed rate transmission of the video information.

It is therefore a basic object of the present invention to provide a television signal transmission system capable of maximizing the amount of auxiliary data which may be transmitted over a television channel without degrading the perceptual quality of the video image reproduced in response to the compressed video data received over the channel.

It is a more specific object of the invention to provide for the time multiplexed transmission of a compressed video signal and one or more auxiliary data signals, wherein the amount of compressed video information is adaptively controlled to insure satisfactory quality of the reproduced video image.

BRIEF DESCRIPTION OF THE DRAWINGS

These and other objects and advantages of the invention will be apparent upon reading the following description in conjunction with the drawings, in which:

FIG. 6 illustrates an exemplary data frame according to the invention; and

FIGS. 7A and 7B illustrate the header structure of the data frame of FIG. 6.

DESCRIPTION OF THE PREFERRED EMBODIMENT

Figure 1:
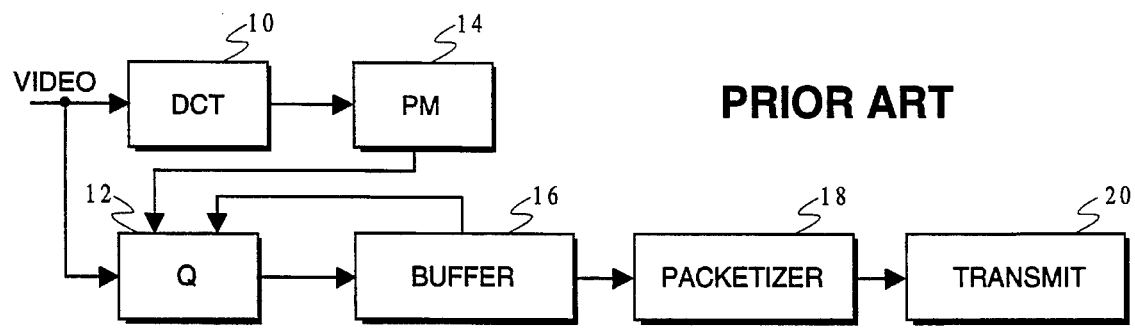
FIG. 1 is a block diagram of a prior art system for compressing and transmitting a video signal.
Figure 2:
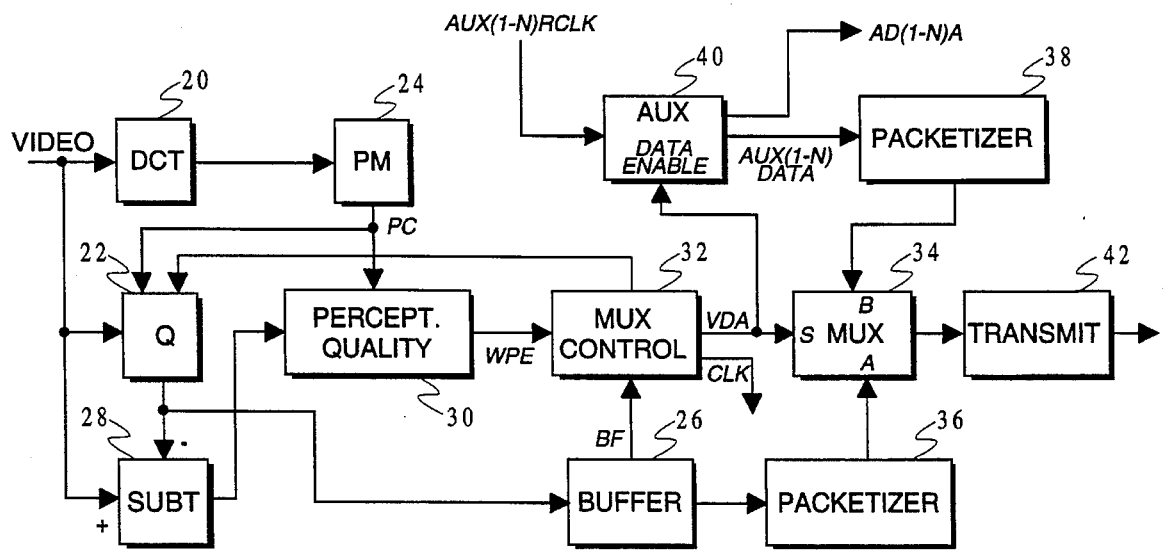
FIG. 2 is a block diagram of a system for transmitting a compressed video signal and one or more auxiliary data signals over a selected channel according to the present invention.

Referring to FIG. 2, as in the prior art system of FIG. 1, a digital video signal is applied to a DCT circuit 20 and to a video compressor 22 both of which may be substantially identical to the corresponding circuits 10 and 12 of FIG. 1. Also, as in the system of FIG. 1, the transform coefficients generated by DCT 20 are applied to a PM 24 (which may be substantially identical to PM 14 of FIG. 1) whose output controls compressor 22. The variable rate output of compressor 22 is applied to a buffer 26.

The input digital video signal is also applied to one input of a subtraction circuit 28 which receives at its other input the compressed video signal from compressor 22. Subtractor 28 includes the necessary circuitry to generate an output signal representing the difference between the input video signal and the corresponding compressed version of the input video signal supplied by compressor 22. This output signal may, for example, comprise the RMS error between the input video signal and the corresponding decompressed signal generated in subtractor 28 in response to the compressed output of compressor 22. It will be understood that this decompressed signal represents the video signal that would be reproduced in a television receiver in response to the received compressed video signal.

Figures 3, 4:
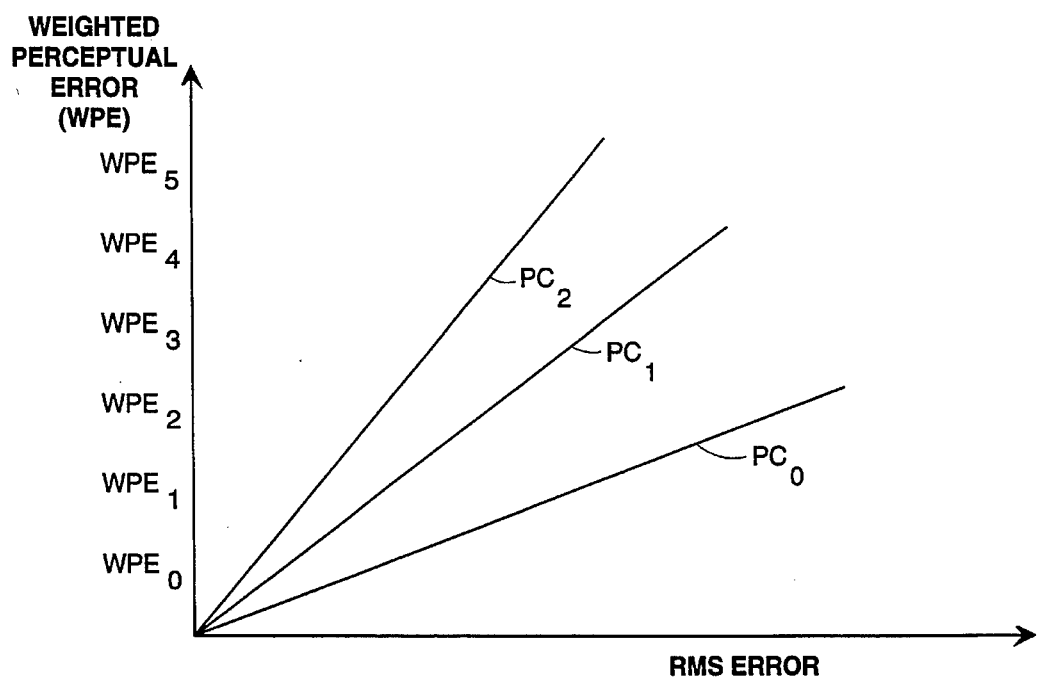
FIG. 3 illustrates a series of exemplary mapping functions incorporated in the perceptual quality circuit of FIG. 2.
FIG. 4 illustrates an exemplary memory look-up table incorporated in the multiplexer control circuit of FIG. 2.

The error signal generated by subtractor 28 is applied to one input of a perceptual quality circuit 30, another input of which is supplied with the output signal of PM 24. As explained in U.S. Pat. No. 5,113,256, the output signal produced by PM 24 identifies the perceptual character of the input video signal to facilitate the operation of compressor 22. According to the present invention, the perceptual character of the video signal as reflected in the output of PM 24 is also used by perceptual quality circuit 30 to appropriately weight the RMS error signal generated by subtractor 28. In particular, referring to FIG. 3, perceptual quality circuit 30 includes a plurality of mapping functions PC each corresponding to a different output of PM 24. Each mapping function PC may be implemented, for example, in the form of a memory look-up table. In FIG. 3, three such functions $PC_o$–$PC_2$ are illustrated, each corresponding to a different perceptual characteristic of the video signal (e.g. edge, texture, etc.). It will be understood that while $PC_o$–$PC_2$ are illustrated as comprising respective linear mapping functions, functions of various other shapes can be used in a equivalent manner.

With further reference to FIG. 3, the error signal generated by subtractor 28 is converted by one of the mapping functions $PC_o$–$PC_2$, selected by the output of PM 24, to a weighted perceptual error signal WPE. Weighting of the error signal produced by subtractor 28 is therefore a function of the perceptual character of the corresponding portion of the video signal. The output signal WPE of circuit 30, which represents the perceivable quality of the video image reproduced in response to the compressed video signal generated by compressor 22, is supplied to one input of a multiplexer control circuit 32. A signal representing the fullness of buffer 26 is applied to a second input to multiplexer control circuit 32.

Referring to FIG. 4, multiplexer control circuit 32 may comprise a memory look-up table for converting the buffer fullness and WPE input signals to an output value which is used to generate a multiplexer control signal VDA. The multiplexer control signal is applied to the select input S of a multiplexer 34, which receives at its A and B inputs the respective outputs of a pair of packetizers 36 and 38. The input of packetizer 36 is coupled to the output of the buffer 26 while the input of packetizer 38 is supplied with an auxiliary data signal from a source 40. Auxiliary data source 40 is enabled in response to the complement of multiplexer control signal VDA. While shown as a single data source, it will be understood that data source 40 may actually comprise a plurality of different interruptable sources of auxiliary data. Alternatively, or in combination therewith, data source 40 may comprise one or more sources of auxiliary data of the type which only require that a certain average data rate be maintained over a given period of time, such as an audio signal accompanying the compressed video signal. The output of multiplexer 34, comprising either the packetized signal supplied to multiplexer input A or B as determined by the multiplexer control signal VDA applied to select input S, is coupled to a transmitter 42 for transmission over a selected channel. Another output of multiplexer control circuit 32 is applied as a control input to video compressor 22.

In practice, auxiliary data source 40 may comprise any of a number of data services which are suitable for broadcast transmission over a television channel in, for example, time division multiplexed form with the compressed video signal. In this regard, packetizers 36 and 38 preferably packetize the auxiliary data and the compressed video information in a similar format but with different subheaders so that different receivers can respond to the two or more different data streams. The amount of each type of data transmitted during any period of time, which is preferably encoded in the subheaders, is determined by multiplexer control circuit 32, which selectively operates multiplexer 34 for coupling either the data from packetized 36 or 38 to transmitter 42.

Referring back to FIG. 4, each value in the look-up table represents the percentage of a given time interval, e.g. a data frame, during which multiplexer 34 is operated for coupling the packetized compressed video information from input A to transmitter 42. During the remainder of the given time interval, auxiliary data source 40 is enabled and packetized auxiliary data is coupled from multiplexer input B to transmitter 42.

According to an important aspect of the invention, transmission of video information has priority over the transmission of any auxiliary data. Thus, the look-up table of FIG. 4 is programmed to provide for the transmission of sufficient video information to insure that a television receiver can reproduce a video image in response thereto of acceptable perceivable quality. The amount of data required to achieve this objective will, of course, vary depending on the nature of the video signal. The look-up table is also programmed to prevent buffer 26 from overflowing. Within these constraints, any excess capacity of the transmission system can be employed for transmitting auxiliary data.

The perceivable quality of the reproducible video image is represented by signal WPE generated by circuit 30 and the fullness of buffer 26 is represented by control signal BF. As shown in the table of FIG. 4, the programmed values increase with increasing values of both control signals WPE and BF. Thus, as signal WPE increases, more of the channel is devoted to transmitting video data and less to auxiliary data. Under these conditions, a control signal is applied to compressor 22 from multiplexer control 32 to decrease the amount of compression being effected and thereby increasing the amount of compressed video data supplied to buffer 26. Assuming that WPE now begins to decrease, the opposite scenario occurs. That is, less of the channel is devoted to transmitting video data and more to auxiliary data. Also, for any given value of WPE, more of the channel is devoted to transmitting video data as buffer fullness increases. In addition, a control signal may be applied to compressor 22 by multiplexer control 32 to increase the amount of compression being effected.

As an example, assume that data is transmitted by transmitter 42 as successive frames of N packets each, each packet comprising either compressed video data (identified by subheader CV) or auxiliary data (identified by subheader Aux). Assuming that buffer 26 is 50% full and that WPE=$WPE_1$, each frame will comprise 0.7N compressed video packets and 0.3N auxiliary data packets. If WPE increases to say $WPE_2$, the ratio changes to 0.9N compressed video packets and 0.1N auxiliary data packets in an attempt to quickly increase the perceivable quality of the reproducible video image. If, on the other hand, WPE decreases to $WPE_o$, less video data (0.5N packets) and more auxiliary data (0.5N packets) is transmitted. It will be seen that similar changes in the operation of the system are effected in response to changes in buffer fullness. At the extreme (excessive values of either WPE or BF), the entire channel may be devoted to the transmission of video data.

Figure 5:
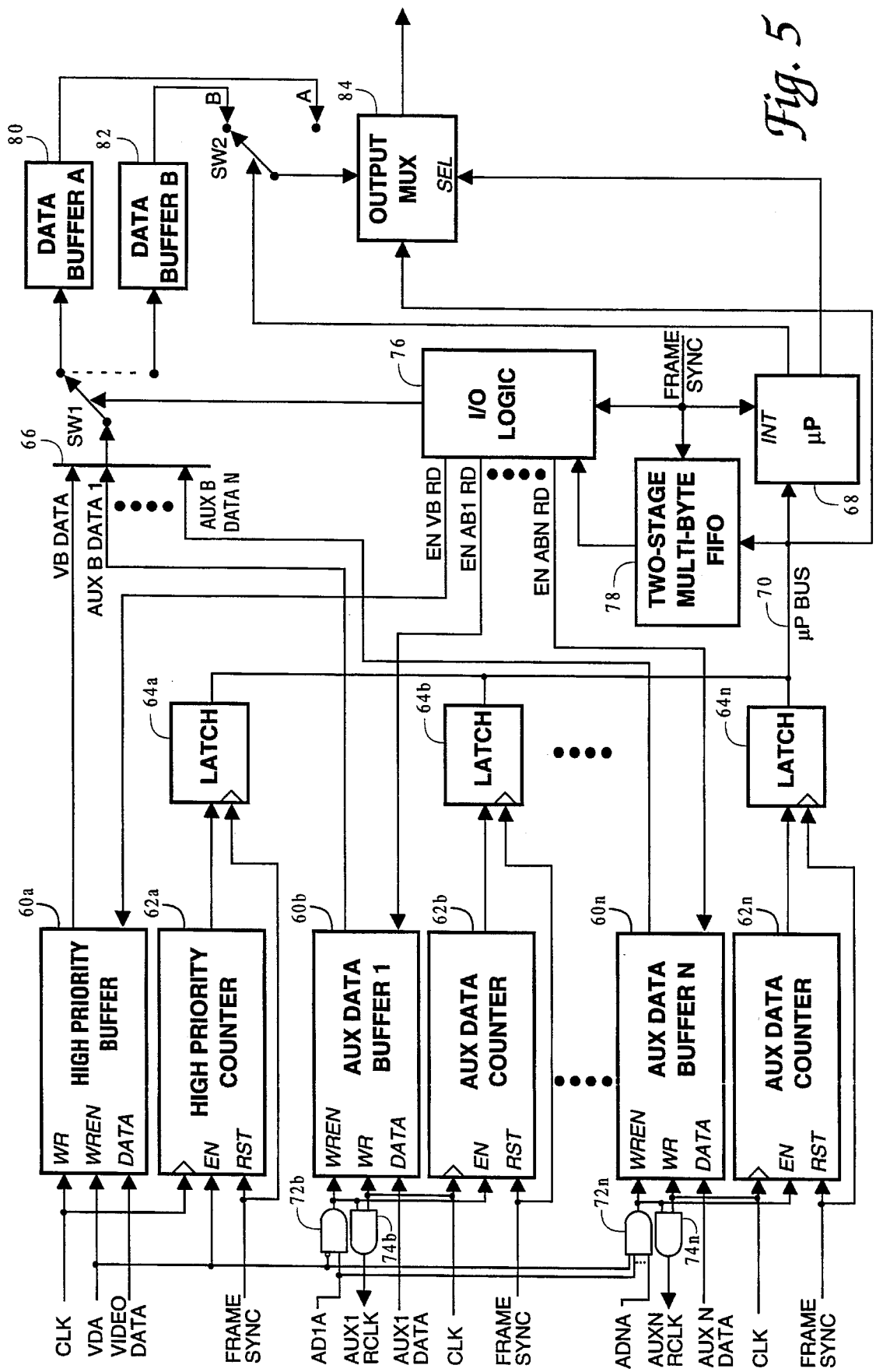
FIG. 5 is an exemplary embodiment of packetizers 36 and 38 and multiplexer 34 of FIG. 2.

FIG. 5 illustrates an exemplary embodiment of multiplexer 34 and packetizers 36 and 38 of FIG. 2. As will be explained in further detail hereinafter, the circuit of FIG. 5 is operable for multiplexing the variable rate compressed video data signal provided at the output of buffer 26 with one or more auxiliary data streams on a prioritized basis to form a data frame as illustrated in FIG. 6. The circuit is further operable for inserting a header 44 in a predetermined location of each data frame, the header 44 comprising a number of subheaders 46 and one or more bytes of data 48 identifying the number of subheaders 46 in the respective header 44 (see FIG. 7A). Each subheader 46 (see FIG. 7B), which identifies a respective one of the multiplexed data streams comprising the data frame, includes a first component 50 identifying the type of data of the corresponding data stream (e.g. video, audio, auxiliary data, etc.) and a second component 52 identifying the number of bytes of the data stream comprising the data frame.

Returning to FIG. 5, the compressed video data signal from buffer 26 is applied to the data input of a two frame delay buffer 60a. Buffer 60a also receives a clock signal (CLK) at its write (WR) input and the output signal VDA (video data active) of multiplexer control circuit 32 at its write enable (WREN) input. The CLK and VDA signals are also applied to the clock and enable inputs respectively of a counter 62a. The output of counter 62a is coupled to the input of a latch 64a, a frame sync signal occurring at the beginning of each data frame being applied to clock the latch and then reset the counter. As will be explained in further detail hereinafter, the output video data from buffer 60a is supplied to a multiplexing node 66 while the output of latch 64a representing the number of bytes in the buffered video data stream for the current data frame is coupled to a microprocessor 68 over a bus 70 to facilitate construction of the video subheader (see FIGS. 7A and 7B).

A similar arrangement is provided for each auxiliary data stream, of which there may be several including an audio data stream to accompany the video data. Thus, each auxiliary data stream AUX1–AUXN, which are supplied by auxiliary data source 40, is coupled to the data input of a respective buffer 60b–60n, whose outputs are each applied to multiplexing node 66. Each buffer 60b–60n is enabled by the output of a respective AND gate 72b–72n and receives the CLK signal at its WR input. An inverting input of each AND gate 72b–72n is supplied with the activity signal reflecting the status of each respective preceding data stream while a non-inverting input of each gate is supplied with the activity signal (ADIA . . . ADNA) of the associated data stream. The output of each AND gate 72b–72n is also supplied to one input of a respective second AND gate 74b–74n, each of which also receives the CLK signal at its second input. The outputs AUX1RCLK–AUXNRCLK of AND gates 74b–74n are coupled back to the respective sources of auxiliary data signals AUX1–AUXN so that each such signal is read from its source synchronously with the CLK signal.

Each buffer 60b–60n also includes an associated counter 62b–62n whose outputs supply respective latches 64b–64n. The output of each latch is coupled to microprocessor 68 over bus 70 to facilitate construction of the associated subheader. Each counter 62b–62n is clocked by clock signal CLK and enabled in response to the output of its associated AND gate 72b–72n. Also, as in the case of the video data channel, the frame synch signal clocks latches 64b–64n and then resets counters 62b–62n. As will be explained in more detail hereinafter, the foregoing arrangement provides a hierarchial structure such that the different data streams are prioritized in order from top to bottom, the highest priority being given to video data, the next highest priority to AUX1 data and so on. Thus, all available video data will first be used in forming a data frame, then all available AUX1 data, and so on until the frame is completely composed.

With further reference to FIG. 5, the frame synch signal is also applied to an interrupt input of microprocessor 68, to an input of an I/O logic unit 76 and to the input of a two-stage, multi-byte FIFO 78. FIFO 78 is coupled between bus 70 and a second input of I/O logic 76. I/O logic 76 includes an output operable for enabling the data bytes stored in the output stage of each respective data buffer 60a–60n to be read to multiplexing node 66 and a further output for operating a switch SW1 coupled between multiplexing node 66 and a pair of data buffers 80 and 82. The outputs of buffers 80 and 82 are coupled by a second switch SW2, whose state is controlled by an output of microprocessor 68, to a first input of an output multiplexer 84. Multiplexer 84 has a second input connected to bus 70 and a select input (SEL) controlled by an output of microprocessor 68.

As an example of the operation of the circuit of FIG. 5, assume that a first frame sync signal has cleared counters 62a–62n and that some compressed video data (i.e. the highest priority data) is available for inclusion in the following data frame. The video activity signal VDA will therefore go active enabling buffer 60a and counter 62a and disabling the remaining buffers 60b–60n and counters 62b–62n. The available bytes of video data for this frame, which shall be referred to as frame A, are therefore loaded into buffer 60a in response to clock signal CLK. At the same time, counter 62a is clocked by clock signal CLK to maintain a running count of the number of bytes of video data stored in buffer 60a.

At some point prior to the end of frame A it is assumed that no more video data will be available for transmission and that signal VDA will therefore go inactive. If at this time, activity signal AD1A is active, meaning that data is available from the first auxiliary data source (i.e. the second highest priority data), AND gate 72b will enable buffer 60b for loading the first auxiliary data and counter 62b for counting the number of data bytes loaded in the buffer. Once all of the available first auxiliary data (if any) is loaded in buffer 60b, activity signal AD1A goes inactive and the same process is repeated in turn for each subsequent auxiliary data source. It will be understood that if data is not available from any one or more sources, i.e. the corresponding activity signal is inactive, that source will be skipped over and no data will be loaded into the corresponding buffer.

After all of the data for frame A has been stored in buffers 60a–60n, the next frame sync signal latches the byte counts accumulated by counters 62a–62n into respective latches 64a–64n and resets counters 62a–62n. Buffers 60a–60n are then loaded on the same prioritized basis with the data for the next frame, i.e. frame B, with the byte count for each buffer being accumulated by the respective counter 62a–62n. At the same time the byte counts corresponding to the frame A data stored in latches 64a–64n are transferred over bus 70 to microprocessor 68 which uses the counts to compose and store a header for frame A as shown in FIGS. 7A and 7B. Also, the frame A counts are written into the input stage of two-stage multi-byte FIFO 78.

The next frame sync signal latches the byte counts accumulated by counters 62a–62n for frame B into latches 64a–64n and again resets counters 62a–62n. Microprocessor 68 uses these counts to compose and store the header for frame B; the frame B counts also being written into the input stage of FIFO 78 whereby the frame A counts are transferred to the output stage thereof. Following this frame sync signal, buffers 60a–60n begin to load the data for the next frame, i.e. frame C. At the same time, I/O logic 76 operates switch SW1 for connecting multiplexing node 66 to buffer 80 and sequentially enables buffers 60a–60n for reading the frame A data into buffer 80. It will be understood that each buffer 60a–60n is enabled by I/O logic 76 in response to the corresponding frame A byte count stored in the output stage of FIFO 78.

The foregoing process is repeated for the next frame but with switch SW1 connected to buffer 82 so that the data for frame B will be stored in this buffer. While this is taking place, the frame A data is read out of buffer 80 and applied to switch SW2, which is operated by microprocessor 68 for coupling the output of buffer 80 to the input of multiplexer 84. During the first segment of the data frame, microprocessor 68 applies a signal to the SEL input of output multiplexer 84 for coupling the stored frame A header over bus 70 to the output of the multiplexer. During the remainder of the frame multiplexer 84 is operated for coupling the frame A data from buffer 80 and switch SW2 to its output. During the subsequent frame, i.e. while frame E is being stored in the input stages of buffers 60a–60n, switch SW1 is operated for storing the frame C data from the output stages of buffers 60a–60n in buffer 80, while the frame B data stored in buffer 82 is developed at the output of multiplexer 84 with the appropriate frame B header. The foregoing process is repeated for all subsequent data frames to provide a plurality of successive data frames at the output of multiplexer 84, each including an appropriate header and each comprising a variable amount of compressed video data and auxiliary data from the various auxiliary data sources.

What has thus been shown is an improved system for adaptively multiplexing compressed video data and auxiliary data for broadcast over a selected television channel, the system being controlled to transmit no more video data than is necessary at any given time to insure satisfactory perceivable quality of the reproducible video image.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A television signal transmission system comprising:

means for developing a variable rate compressed digital video data signal representing a source video signal;

means for generating an error signal representing the difference between said source video signal and a decompressed representation of said compressed video data signal;

means for weighting said error signal in accordance with a perceptual characteristic of the source video signal;

means for developing at least one auxiliary data signal;

means for multiplexing said auxiliary data signal and said compressed video data signal for generating a multiplexed output signal; and control means coupled to said multiplexing means and to said means for developing a compressed digital video data signal and responsive to said weighted error signal for controlling the relative amount of said compressed video data signal comprising said multiplexed signal.

2. The system of claim 1 including means for buffering said compressed video data signal and for generating a control signal representing the fullness thereof, said control means being further responsive to said control signal for controlling the relative amount of said compressed video data signal comprising said multiplexed signal.

3. A method of forming a data transmission frame comprising a plurality of packets of auxiliary data and variable rate compressed video data, said compressed video data representing a source video signal, comprising the steps of:

developing an error signal representing the difference between said source video signal and a decompressed representation of said compressed video signal;

weighting said error signal in accordance with a perceptual characteristic of said source video signal; and adjusting the number of compressed video data packets comprising said data frame in response to said weighted error signal.

4. The method of claim 3 including buffering said compressed video signal and further controlling the number of auxiliary data and compressed video data packets comprising said data frame in response to said buffering step.

5. A system for forming a data frame comprising a plurality of different time multiplexed data streams, comprising:

a plurality of data sources each comprising means for generating a respective one of said data streams and an associated activity signal representing the availability thereof;

a plurality of buffers each supplied with a respective one of said data streams and the associated activity signal, said buffers being assigned respective relative levels of priority and operated such that the buffer having the highest relative level of priority is enabled for storing the one of said data streams supplied thereto in response to the presence of its associated activity signal and each of the remaining buffers is enabled for storing the one of said data streams supplied thereto in response to the presence of its associated activity signal and the absence of the activity signals supplied to the buffers of higher relative levels of priority; and means for reading the data streams stored in said buffers one at a time for forming said data frame.

6. The system of claim 5 wherein each of said data streams comprises one or more data bytes, said system further including means for counting the number of data bytes of each of said data streams stored in a respective one of said plurality of buffers and further including means for inserting said numbers in a predetermined portion of said data frame.

7. The system of claim 6 wherein said means for reading comprises means responsive to said numbers for enabling each of said buffers in turn for outputting the respective data streams stored therein.

8. The system of claim 5 including a common node at which the respective data streams read from said buffer are combined in a time multiplexed fashion.

9. The system of claim 5 including means for synchronously providing said plurality of data streams for storage in said buffers.

10. The system of claim 5 wherein the data stream supplied to the one of said buffers having the highest relative level of priority comprises a compressed digital video data signal.

11. A system for forming a data frame comprising a plurality of time multiplexed data signals, comprising:

means for generating a variable rate compressed video data signal and an activity signal representing the availability thereof;

means for generating one or more auxiliary data signals and a corresponding number of activity signals, each of said activity signals representing the availability of a respective one of said auxiliary data signals;

a plurality of buffers each supplied with a respective one of said compressed video and auxiliary data signals and the activity signal representing the availability thereof, each of said buffers being assigned a relative level of priority and operated such that the buffer having the highest relative level of priority is enabled for storing said compressed video data signal in response to the presence of the activity signal supplied thereto and each of the remaining buffers is enabled for storing a respective one of said auxiliary data signals in response to the presence of the activity signal supplied thereto and the absence of the activity signals supplied to the buffers of higher relative levels of priority; and means for reading the data signals stored in said buffers one at a time for forming said data frame.

12. The system of claim 11 including means responsive to a source video signal for generating said compressed video data signal and means for generating the activity signal associated therewith as a function of the difference between said source video signal and a decompressed representation of said compressed video data signal.

13. The system of claim 12 wherein said means for compressing is responsive to said difference for varying the level of compression effected thereby.

14. The system of claim 13 wherein each of said data signals comprises one or more data bytes and including means for counting the number of data bytes of each of said data signals stored in a respective one of said buffers and further including means for inserting said numbers in a predetermined portion of said data frame.

15. The system of claim 14 wherein said means for reading comprises means responsive to said numbers for enabling each of said buffers in turn for outputting the respective data signal stored therein.

16. The system of claim 11 including means for synchronously providing said data signals for storage in said buffers.

* * * * *